United States Patent [19]

Castel et al.

[11] Patent Number: 4,593,352
[45] Date of Patent: Jun. 3, 1986

[54] METHOD AND DEVICE FOR EXCHANGING INFORMATION BETWEEN TERMINALS AND A CENTRAL CONTROL UNIT

[75] Inventors: Rene Castel, Tourette sur Loup; Jean-Louis Calvignac, LaGaude, both of France; Wilburn D. Draper, Raleigh, N.C.

[73] Assignee: International Business Machines Corp., Armonk, N.Y.

[21] Appl. No.: 474,401

[22] Filed: Mar. 11, 1983

[30] Foreign Application Priority Data

Mar. 24, 1982 [EP] European Pat. Off. ........ 82430008.1

[51] Int. Cl.⁴ ............................................. G06F 13/28
[52] U.S. Cl. ................................................... 364/200
[58] Field of Search ... 364/200 MS File, 900 MS File

[56] References Cited

U.S. PATENT DOCUMENTS

| | | | |
|---|---|---|---|
| 4,001,790 | 1/1977 | Barlow | 340/172.5 |
| 4,015,243 | 3/1977 | Kurpanek | 364/200 |
| 4,028,668 | 6/1977 | Riikonen | 364/200 |
| 4,067,059 | 1/1978 | Derchak | 364/200 |
| 4,133,030 | 1/1979 | Huettner | 364/200 |
| 4,156,932 | 5/1979 | Robinson | 364/200 |
| 4,417,304 | 11/1983 | Dinwiddie | 364/200 |
| 4,437,157 | 3/1984 | Witalka | 364/200 |

OTHER PUBLICATIONS

IBM Technical Disclosure Bulletin—vol. 21, No. 12, May 1979, p. 4882, "Adapter High Level Interface", by J. Calvignac, R. Castel and W. Drafer.

IBM Technical Disclosure Bulletin—vol. 24, No. 6, Nov. 1981, pp. 2779–2781, "Rapid Set-Up for Cycle Steal Commands", by R. C. Booth.

IBM Technical Disclosure Bulletin—vol. 20, No. 11B, Apr. 1978, pp. 4692–4695, "Suppress Exception Mechanism for Input/Output Device", by R. E. Birney, D. G. Bourke and H. L. Kurtz.

IBM Technical Disclosure Bulletin—vol. 21, No. 7, Dec. 1978, pp. 2633–2645, "Programmable Communication Subsystem Having Controller Incorporating Microprocessor", by D. M. Nagel and J. W. Van Der Berg.

Primary Examiner—James D. Thomas
Assistant Examiner—Florin Munteanu
Attorney, Agent, or Firm—John B. Frisone

[57] ABSTRACT

Information exchange method in a communications controller comprising a central control unit (CCU) associated with a storage that provides a number of parameter/status and data areas equal to the maximum number of interfaces to be managed by the controller. The storage contains a line vector table which indicates the address of each area assigned to each interface. The exchange of the parameter/status information and data on the input/output bus (IO5) uses a minimum number of input/output operations controlled by the program stored in the storage (3).

16 Claims, 6 Drawing Figures

METHOD AND DEVICE FOR EXCHANGING INFORMATION BETWEEN TERMINALS AND A CENTRAL CONTROL UNIT

TECHNICAL FIELD

The present invention relates to a method and a device for exchanging information between the central control unit and the communication line adapters in a communication controller.

BACKGROUND OF THE INVENTION

In general, a communications controller comprises a central control unit associated with a storage storing the network control program and with an input/output interface connected to an input/output bus. The terminals controlled by the communications controller are connected to line adapters which in turn are connected to the input/output bus. Furthermore, one or several central processing units are connected to the input/output bus, the communications controller having the task of ensuring and managing the data exchanges between the terminals and the central processing unit(s).

PRIOR ART

The article published in the IBM Technical Disclosure Bulletin, volume 21, No 12, May 1979, page 4882, describes a means for improving the information exchange between the central processing unit and the adapters by performing, as far as possible the transfer operations in cycle-steal mode to reduce the number of interruptions during the execution of the program.

SUMMARY

The object of the present invention is therefore a method and a device for exchanging information between a central control unit and communication lines, whereby the types of input/output operation are chosen so as to reduce their number.

The present invention relates to a method for exchanging information which can be used in a communications controller of the type comprising a central control unit associated with a storage, part of which serves to store a network control program. The central control unit is connected through an input/output interface to an input/output bus to which are attached, on the one hand, the communication line adapters including a microprocessor and a storage, and on the other hand at least one central processing unit, the central control unit communicating with the adapters by cycle-steal transfer operations (AIO) and input/output operations (PIO).

The method comprises the steps of: establishing, by a first output operation a line vector table at a given address in the control unit storage, said table providing for each communication line first and second address positions, each one storing the address of the location of a storage area reserved for storing control information (parameter/status) relative to the transmit and receive interfaces of each communication line; sending by a second start line initial output operation, a first code indicating the address of an adapter to be selected and the type of output operation; issuing an acknowledgment signal by the adapter having recognized its address and storing the first code in the adapter; sending, by the central control unit, a second code indicating the address of the interface of a selected line and a command dedicated to the selected interface; calculating, by the adapter microprocessor the addresses in the table corresponding to the interfaces of the selected line as a function of the first and second codes and cycle stealing the information contained at these addresses to associated control blocks in microprocessor storage locations assigned to the interfaces of said line; and exchanging in cycle-steal mode between the control unit and the adapters the information of the parameter zone assigned to the selected interface and the corresponding data.

This method further includes in normal exchange mode the steps of: issuing, by the central control unit through a third start line output operation, the first code specifying the address of the adapter to be selected and the type of output operation; issuing an acknowledgement signal by the adapter which has recognized its address; issuing the second code specifying the address of the selected line interface used by the selected adapter to localize the control block containing the address of the parameter/status area assigned to the interface and a command for the interface; transmitting in cycle-steal mode information from the parameter zone located at the address contained in the thus localized control block in the central control unit storage to the parameter zone of the microprocessor storage assigned to the interface.

To implement the method of the present invention, each adapter is provided with a circuit for recognizing the code specifying the address sent by the central control unit to the input/output bus, said code providing a first field being indicative of the position of a board comprising one or two adapters, it being assumed that each board is connected to a number of interfaces equal to 2k, and a second field being indicative of the board type.

BRIEF DESCRIPTION OF THE DRAWINGS

The foregoing and other objects, features and advantages of the invention will be apparent from the following more particular description of a preferred embodiment of the invention, as illustrated in the accompanying drawings.

TECHNICAL DESCRIPTION

Figure 1:
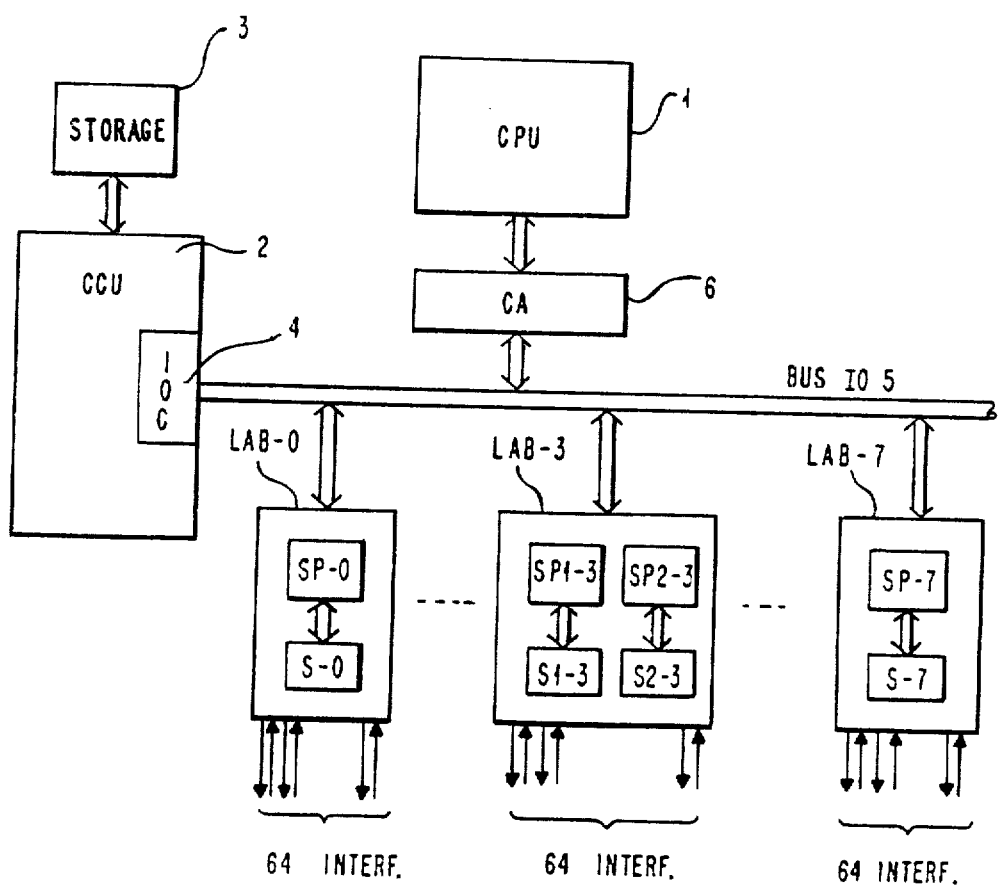
FIG. 1 illustrates the block diagram of a communications controller in which the method according to the present invention can be used.

FIG. 1 illustrates the block diagram of a communications controller to show the environment in which the present invention can be used. The communications controller controls the data exchange between the terminals connected to communication lines and at least one central processing unit (CPU 1) which can be an IBM System/370 type computer.

For exchanging information from the terminals to the central processing unit (CPU), the controller scans the communication lines, multiplexes the data on these lines, and transmits the data stream thus obtained to the central processing unit via a high-speed channel.

For exchanging information from the central processing unit to the terminals, the controller receives the multiplexed data to be transmitted from the central processing unit via a high-speed channel, demultiplexes these data and transmits them to the terminals selected by addressing.

As illustrated in FIG. 1, the controller comprises a central control unit (CCU 2) such as the IBM 3705 Communications Controller. This control unit is a processor which operates under control of a network control program with different interrupt levels. Each event causes an interrupt at a given level of the program so that the event processing code is processed. The central control unit (CCU) is associated with a main storage 3 and an input/output control interface IOC 4.

An input/output bus IO 5 is connected to interface IOC 4. The central processing unit (CPU 1) is connected to bus IO 5 by a channel adapter CA 6.

In the preferred embodiment, the communication lines are attached to a number of line boards LAB 0 to LAB 7. A maximum number of 64 interfaces is attached to each board, that is 32 full duplex communication lines consisting of a transmit and a receive interface.

Each board includes the circuits of line adapters. Each adapter comprises a scanning processor SP and a corresponding line scanning device S. The scanning processor is a microprocessor which relieves the central control unit of certain functions, mainly those related to data processing on the associated lines. The scanning devices S comprise storages which store data received or to be transmitted. Depending on the network configuration, a board can comprise one or two adapters.

FIG. 1 only represents three boards: LAB-0, LAB-3 and LAB-7. Board LAB-3 is assumed to comprise two processors: SP1-3 and SP2-3. The elements SP and S of the other boards are designated by SP-0, S-0 and SP-7, S-7 respectively.

Figure 2:
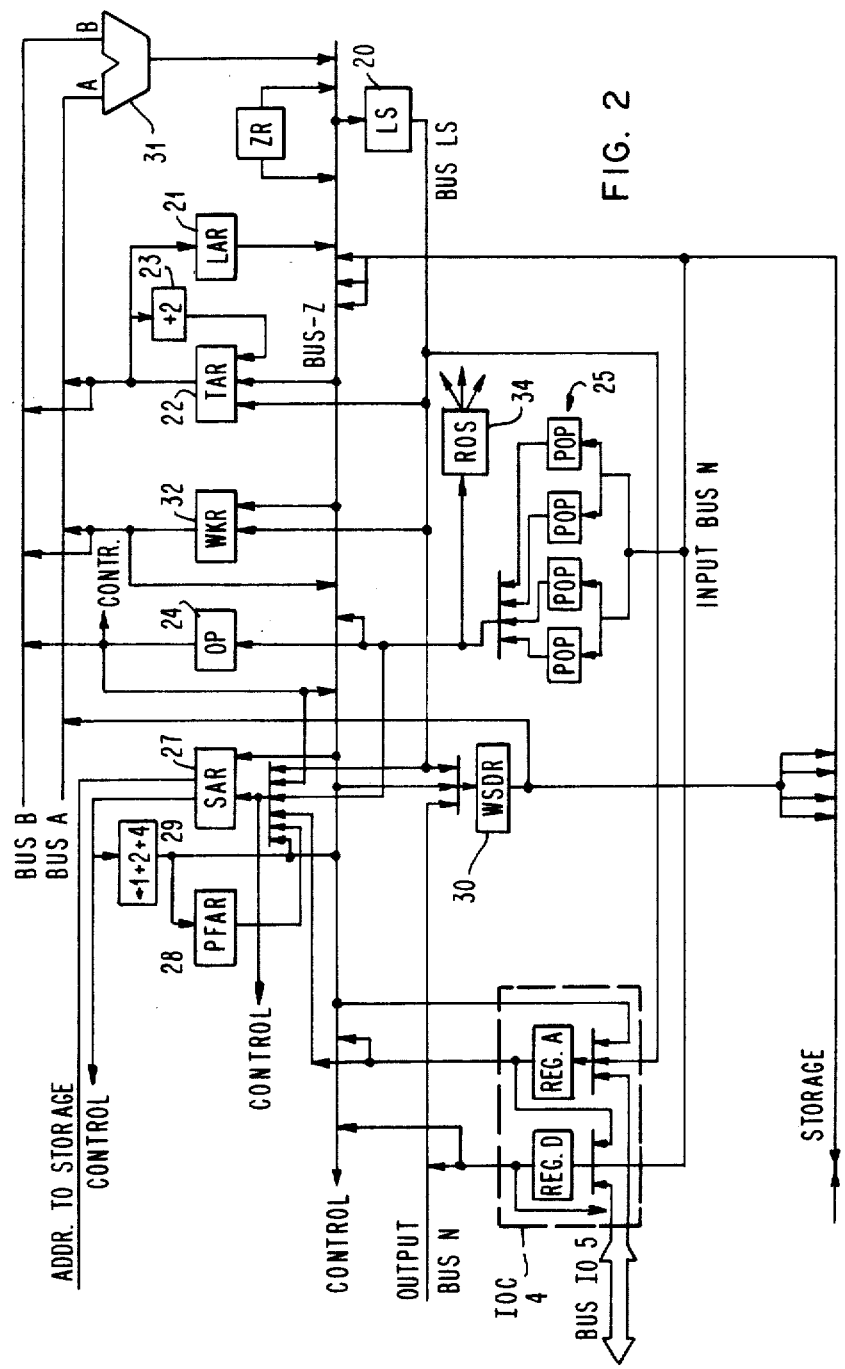
FIG. 2 illustrates the data flow of the central control unit (CCU).

The boards are connected to input/output bus IO 5. FIG. 2 illustrates the data flow of the central control unit. This unit comprises the circuits and the data paths for executing an instruction set consisting of the 51 instructions of the IBM 3705 Controller, and of two additional instructions which will be described later on. They furthermore allow storage addressing, logical and arithmetic data processing and control of the adapters attached to this unit.

This unit has a local storage LS 20 wherein are defined, at given address positions forty general registers used by the control program to execute the instructions and to process the data. These registers are divided into five groups of eight registers each. Each group is assigned to one of the five possible program levels. Thus a program running at a given level can be interrupted at another level without the need for saving the register contents.

Furthermore this unit comprises external registers for storing the information required for communication between the control program and the hardware. These external registers contain information relative to the hardware and/or the program. By using an input instruction, the control program can load the contents of an external register into a general register wherein it can process data. Output instructions are used to load the contents of the general register determined by the instruction into an external register. These registers are:

A lagging address register LAR 21 which contains the address of the last instruction executed before the instruction currently being executed. This LAR 21 register is loaded from the instruction address register IAR 22 at the execution start of each instruction. An increment 23 increments register IAR to a value pointing to the following address.

An operation register OP 24 used to store the first 16 bits (halfword) of the instruction under execution. This register is loaded from the four registers POP 25 which allow the instructions to be pre-fetched from the main storage connected to the control unit, part of which is reserved for storing the control program.

The control unit comprises a storage address register SAR 27 (22 bits plus three parity bits), a pre-fetch instruction address register PFAR 28 with an address incrementer, and a write store data register WSDR 30. An arithmetic and logical unit 31 executes the program-controlled arithmetic and logic operations. This unit is associated with the working registers WKR 32. Register ZR stores the data on bus Z.

Interface IOC 4 comprises two registers: register D (16 data bits plus two parity bits) is used with bus IO 5 for exchanging all addresses, commands and data from/to the adapters. Register A is a 25-bit register (22 data bits plus three parity bits). Its use is described in the following.

The read-only storage 34 contains the control words CW required to control the operations executed by the control unit.

Because this unit is the same as the IBM 3705 type Communications Controller it will not be described in detail here.

The two instructions added to the instruction set of the IBM 3705 Controller are:

A first instruction which is an input/output instruction IOH of the RR type (register to register) of the following format:

| 0 | R2 | 0 | R1 | X"50" |
|---|----|----|----|-------|
| 0 | 1 3 | 4 | 5 7 | 8   15 |

This instruction causes the transfer of the contents of the register determined by field R1 to a channel or line adapter determined by the contents of field R2 or vice versa. The contents of the register determined by R1 is loaded into register A. This instruction can only be executed at program levels 1, 2, 3 and 4. An attempt to execute it at level 5 would result in an interrupt request at level 1. If the processor does not receive any valid response within a predetermined time, a level-1 interrupt "no adapter response" occurs. X'50' indicates that the second byte of the instruction contains 50 in hexadecimal notation.

The second instruction is an immediate value input/output instruction IOH1 of the RA type of the following format:

| 0 0 0 0 0 | R1 | X"70" |
|-----------|----|----|
| 0       4 | 5 7 | 8   15 |

| Immediate Value - I |
|---------------------|
| 16                  |

This instruction transfers the contents of the register determined by R1 to an external register or vice-versa.

This external register is determined by the immediate value I of the second halfword. This instruction may be used to address the channel or line adapters.

The exchanges between the control unit and the adapters use two types of operation: program-initiated operations PIO, and adapter-initiated operations AIO which correspond to information exchanges in cycle steal mode. The input/output instructions IOH and IOHI allow the execution of the PIO operations.

The input/output bus IO 5 is a conventional type bus providing the lines required to execute the two types of operation.

The data bit exchange (a halfword divided into byte 0:B0 and byte 1:B1 plus one partiy bit per byte) requires 18 lines. The tag and command exchange requires 15 lines.

The following table illustrates the signals sent to these lines.

| IO BUS LINES | CCU | DIRECTION ADAPTER |
|---|---|---|
| Input Output | IO | → |
| Tag Address | TA | → |
| Tag Data | TD | → |
| Read/Write Output | R/W | → |
| Halt | HALT | → |
| Reset | RES | → |
| Cycle Steal Grant | CSG | → |
| Cycle Steal Request | CSR | ← |
| Valid Byte | VB | ← |
| Valid Halfword | VH | ← |
| Parity Valid | PV | ← |
| Interrupt Request Removed | IRR | ← |
| End of Chain | EOC | ← |
| Modification | M | ← |
| Data Byte 0 | B0 | ←→ |
| Data Byte 1 | B1 | ←→ |

Figure 3:
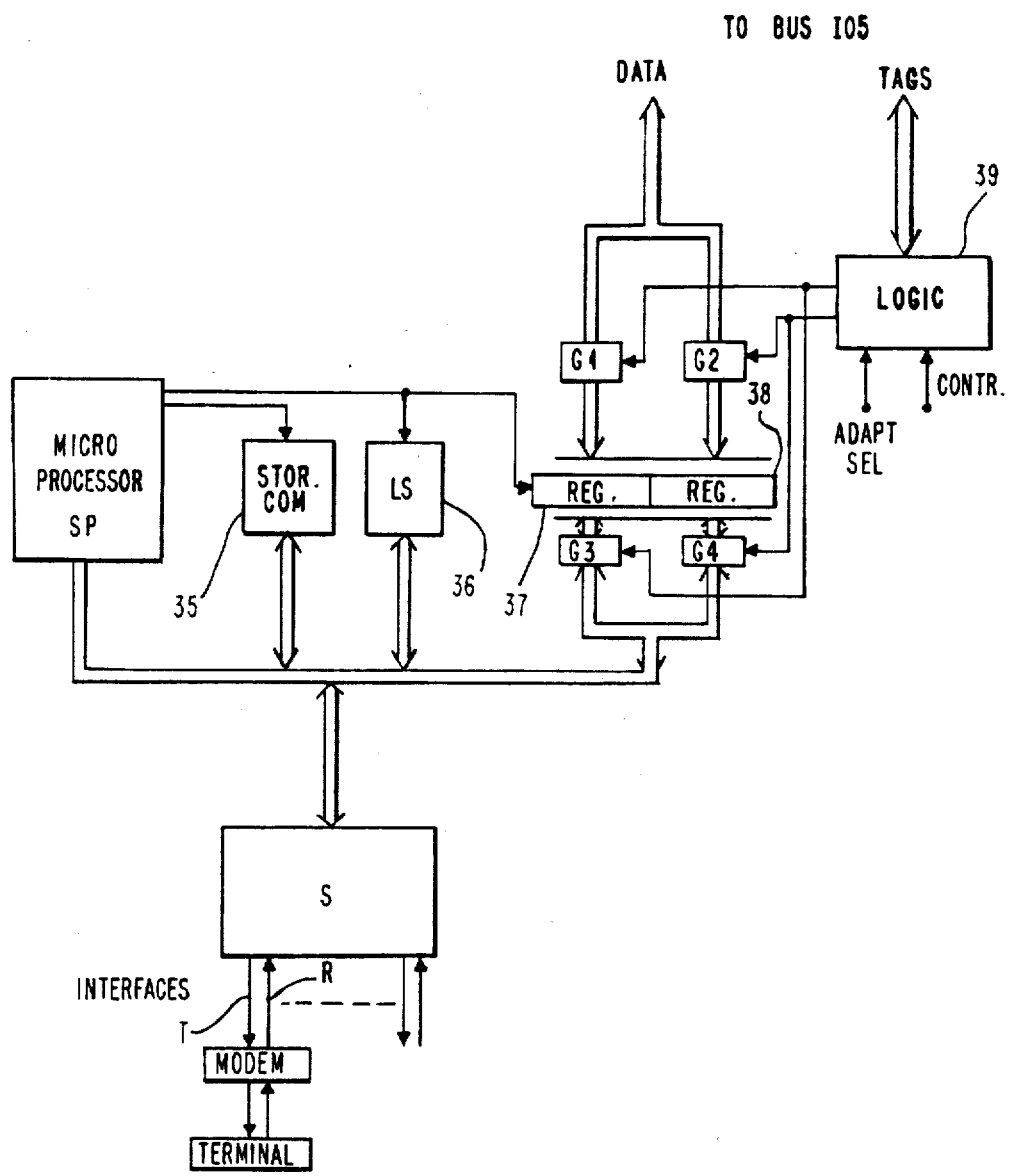
FIG. 3 illustrates, schematically, a processor-scanner assembly and its connection to the input/output bus.

FIG. 3 illustrates schematically a line adapter comprising processor SP associated with a storage 35 and a local storage LS 36. The command microcode of the microprocessor is stored in storage 35 and the local storage comprises the general and external registers of the microprocessor at different positions. The microprocessor is connected to the scanner S properly speaking which includes the logical circuits and storage devices buffering the data and commands to be exchanged with the terminals through the transmit and receive interfaces T and R and possibly modems.

The exchange with the central control unit (CCU) is governed by the protocols defined hereafter by means of two interface registers 37 and 38 that store the information from bus IO 5 for a CCU-to-adapter operation or from storage 35 for an adapter-to-CCU operation.

A logic circuit 39 receives/sends the tags from/to bus IO 5 to apply at the appropriate times signals TA and TD to drive gates G1, G2, G3 and G4 for information flow to the desired locations depending on the type of operation. The selected adapter signal ADAPT. SEL. is generated by a logical circuit which will be described later. Circuit 39 also receives CONTROL signals that are generated by the microprocessor circuits, for example the parity indicator signals, in order to generate the appropriate tags to be sent to the CCU.

Registers 37 and 38 each comprise 16 data bit positions. They are made up of positions of the local storage 36 and as such can be addressed by the microprocessor.

The operations resulting from an IOH or IOHI instruction are described in the following.

When an IOH or IOHI instruction is decoded, the IOC interface is tested; if it is idle, the field defined by R2 for instruction IOH or by I for instruction IOHI is loaded into register D, and the field defined by R1 (data field) is loaded into register a in case of a write operation. The operation is then initiated and the IOC is signaled as busy.

The IOC initiates this PIO type operation by bringing up the IO and read/write output signals. All adapters attached to this bus must remove the interrupt requests they may be presenting raise line IRR and bring down line VH.

The IOC interface sends the register D contents to the data bus. After it has recognized the end of signal VH and after the internal processing time, line TA is energized and the information flows from the data bus into register 37, gate G1 being on.

All adapters receiving signal TA test the address bits to determine which adapter has been addressed. The selected adapter responds by sending signal VH. When the IOC interface receives VH, it terminates TA and removes the contents of register D from the data bus. After having recognized the end of TA, the adapter terminates VH.

At this time of sequence IO, the operation depends on the type of operation, that is, input or output operation.

For a CCU-to-adapter output operation, interface IOC sends the data halfword of the R1-determined register to the data bus for transfer to register 38 at the appropriate time. After the internal processing time, the IOC energizes line TD (tag data). After having recognized this TD tag, the adapter energizes VH (valid halfword). When IOC recognizes VH, it terminates signals TD, IO and R/W Output and removes the data from the data bus. When the adapter has recognized the end of TD, it terminates VH.

For an adapter-to-CCU input operation, the IOC terminates R/W Output and energizes TD. When the adapter recognizes TD, it sends the requested data to the data bus via register 38. When the data has been sent with the correct parity, the adapter energizes lines PV and VH. After the internal processing time following VH recognition (parity will be generated if the valid parity line has not been energized), the IOC loads the data into register D, and the CCU logic loads the data into the R1-specified register.

When the data is loaded into register D, the IOC terminates TD.

When the adapter recognizes the end of TD, it terminates VH and PV and removes the data from the bus. When the IOC recognizes the end of VH, it terminates IO. The end of signal IO causes the previously selected adapter to be no longer selected. As a result, all adapters that have any interrupt requests pending send their requests and terminate their IRR signal. Adapters that have no interrupt request pending terminate their IRR signal upon recognition of the IO signal end.

After recognizing that IRR is no longer energized and VH is energized, the IOC resets the IOC busy signal.

In the following, an AIO operation will be described.

This operation differs from the afore-mentioned operation in that the data transfer is initiated and controlled by the adapter and in that several data units can be transferred during the operation.

An adapter starts an AIO operation by energizing line CSR (cycle steal request). At reception of CSR, the IOC, when not busy, initiates an IOC operation; it signals its busy status and raises line IO. All adapters respond in the same manner as for a PIO operation. Those receiving the IO signal energize line IRR and those having previously placed interrupt requests on the data bus remove them and suppress signal VH. This signal is also suppressed if there had been no interrupt request.

When the IOC recognizes that all adapters have removed their signal VH, it energizes line CSG (cycle steal grant). This line is daisy-chained from one adapter to the other in priority order. If two adapters request a cycle steal operation at the same time, the first adapter in the chain gets signal CSG and inhibits its propagation down the chain.

If a requesting adapter receives signal CSG, it places a cycle steal control word (CSCW) on the data bus and energizes VH and PV. It also terminates CSR.

After the internal processing time following VH recognition, the IOC tests the parity of the CSCW word and terminates the AIO operation, if the parity is not correct, by sending the HALT signal.

At this point in the AIO sequence, the IOC may take different actions depending on the value loaded into the CSCW.

The data transfer by means of an AIO operation is under adapter control. The adapter uses the CSCW word to tell the IOC at which address in storage 3 to start fetching or storing the data. Once started, the operation continues until the adapter tells the IOC to stop.

The procedure for exchanging data between the IOC and the adapter is the same as for a PIO operation except for the last transfer.

If the last transfer is a halfword transfer (two bytes), the adapter energizes the end-of-chain line (EOC) instead of VH.

If the last transfer is a byte transfer from or to a halfword processing adapter, the latter energizes the modifier line (M) and valid byte line (VB).

When the IOC recognizes EOC or VB and M, it terminates TD (data tag). The adapter recognizes the end of TD and removes data in case of a read operation and terminates EOC or VB and M.

A timeout occurs in the IOC interface when an adapter does not respond (within 60 microseconds) to the activation or deactivation of any one of the five interface tags VB, VH, EOC, IRR and M. It causes termination of the remainder of the operation by sending the HALT tag to the adapters and an IOC check is performed.

The exchange procedure between the central unit and the line adapters according to the present invention is most efficient when the number of PIO input/output operations is limited as far as possible. The interface uses only one output instruction and only one input instruction of the IOH type during normal operation. One of these output instructions called START LINE initiates, in the line adapter processors, operations that in the prior art systems of the IBM 3705 type required multiple input/output instruction sequences. The get line identification input instruction (GET L ID) initiates the process of automatic selection of an adapter and identifies the interface requesting a service during a level-2 interrupt of the CCU.

Three additional output instructions called SET LINE VECTOR TABLE HIGH, SET LINE VECTOR TABLE LOW and START LINE INITIAL described in more detail later are used to initiate the exchange procedure between the CCU operating under control of the network control program and the line adapters.

Figure 4:
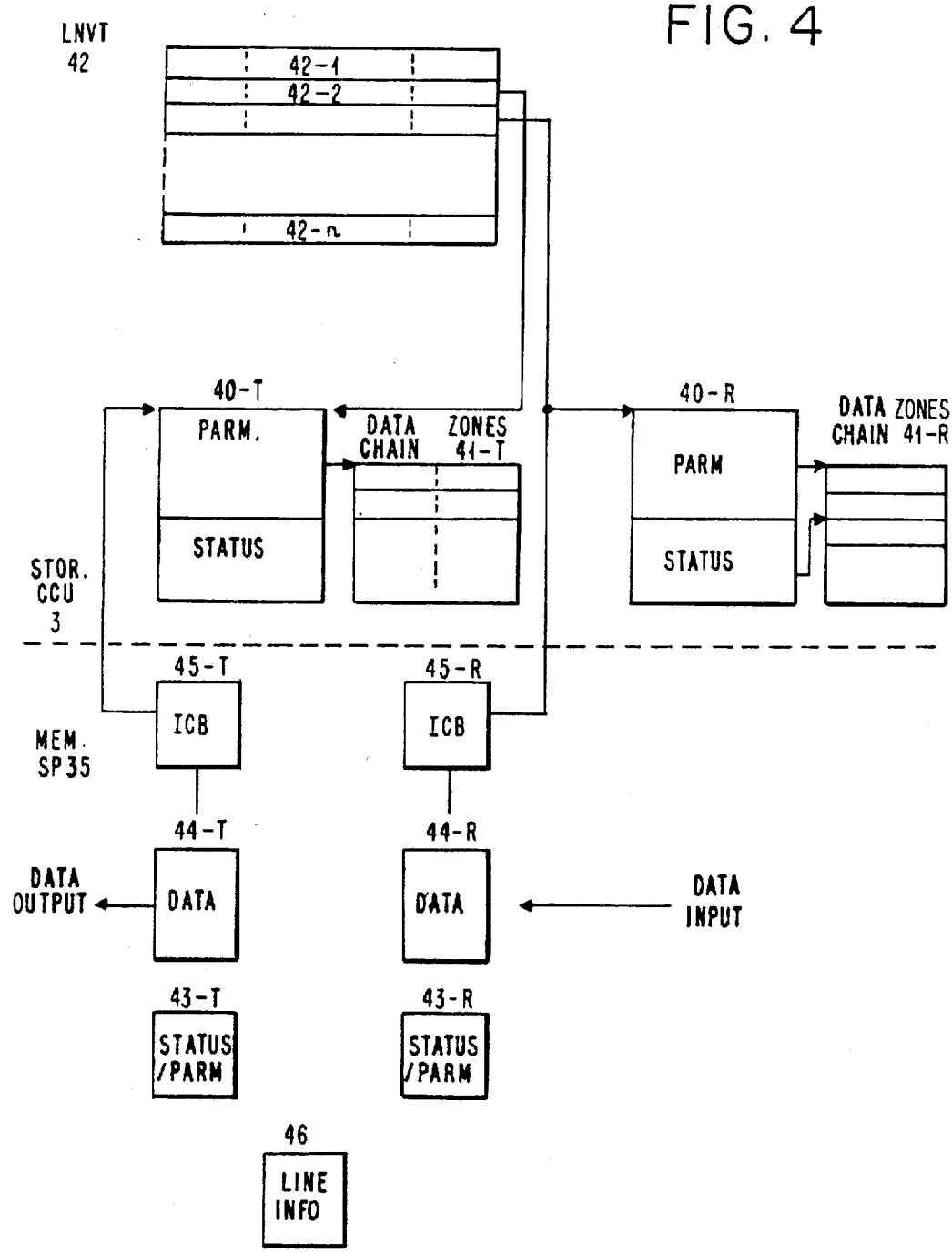
FIG. 4 illustrates the partitioning of the central control unit (CCU) and adapters storages.

FIG. 4 illustrates the paritionning of storages 3 and 35. The control program resident in CCU storage 3 must assign a fixed-length field of storage positions for each serviced line interface. This field, called parm/status area 40, is used for command and status information transfer between the CCU and the SP processors of the line adapters. The information is transferred in cycle steal mode by 16-byte blocks (or less) under control of the line-managing SP processor. The parm/status area consists of a 16-byte parameter zone and of a 12-byte status zone.

The parameter zones are used to transmit to the SP processors the parameters required for command execution. The status zone is used to transmit to the control unit the status information determining the end of an operation. When receiving a START LINE instruction, the line-managing SP processor cycle steals information from parameter zone 40, executes the command and sends status information in cycle steal mode to status zone 40, and finally presents an interrupt request to the CCU.

Each parm/status area is associated with a chain of storage areas 41 where the data to be exchanged is stored.

In FIG. 4, the elements followed by suffix T relate to a transmit interface and the elements followed by suffix R relate to a receive interface.

The different input/output operations required for the initialization operations will be described in the following.

FIG. 4 illustrates a line vector table (LNVT) referenced 42 in storage 3. This table is used for the network control program routines to localize the control information associated with a communication interface only in case its address is known. Each input 42-1 to 42-n in the table is associated with only one line interface and contains the complete address word (four bytes) of the parm/status area associated with the interface.

The LNVT table can be placed anywhere in storage 3; it is defined by executing output instructions called SET LNVT TABLE for each SP processor. These IOH instructions whose format of the contents of the R1 and R2-addressed registers will be described later allow the transfer of the LNVT table address to each SP processor.

The SET LNVT TABLE instructions are executed for each processor when the table is to be displaced. The full words consist of four bytes, three of which are used as follows:

| | byte X | byte 0 | byte 1 |
|---|---|---|---|

The SET LNVT TABLE ADDRESS HIGH instruction is used to set up byte X and the SET LNVT TABLE ADDRESS LOW instruction is used to set up bytes 0 and 1. The contents of the different bytes will be given later.

If these instructions are not executed after each program load operation in the SP processors, the so-called default location of the LNVT table address is, for example, assumed to be at position X '880'. The table then consists of 512 words in the example where the controller manages a maximum of 256 full duplex lines.

The instruction called START LINE INITIAL (SLI) is used each time the control program dynamically switches to a new parm/status area to give the SP processor the new address of the parm/status area. This is obtained by placing the new address in table LNVT and by executing an SLI instruction. The control program uses the SLI instruction to transfer the interface address and a command to the SP processor managing this interface. The SP processor uses the interface address to calculate the location in table LNVT containing the new address of the parm/status area, cycles steal this address from table LNVT and saves it in the ICB interface control block for subsequent START LINE instructions (SL). The remaining processing of this SLI instruction is the same as that described hereafter for the SL instruction.

In the line adapters, the SP processors are provided with a control storage where storage positions are assigned to each interface arranged in the same way as in storage 3, as illustrated in FIG. 4. A parm/status area 43 associated with positions 44 for buffering the data and interface control blocks ICB 45-T and 45-R, is assigned to each interface.

When executing a START LINE instruction, the parameters required to execute the commands of the SP processors are passed to the processors via the parm/status area 40. The control program resident in storage 3 prepares the parameters which depend on the type of interface and the type of transmission on the interface (protocol and exchange direction) and then initiates processing in the SP processors by executing an SL or SLI instruction. These instructions provide the interface address and different possible commands to the SP processors. For the SL instruction, each processor uses the address of the interface to localize the appropriate SP control block ICB 45-T or 45-R.

The address of the parm/status area extracted from this control block is used to cycle steal the parameters from zones 40 to zones 43. Execution of the command then proceeds based on the command specified.

The get line identification instruction GET L ID is used when, for reasons such as normal ending of an operation on an interface or the detection of an error, the control program must know what the conditions of termination were. The SP processor managing the interface achieves this by transmitting in cycle steal mode the ending status information from zone 43 to status zone 40 and by initiating an interrupt request at a given level, for example level 2. The level-2 interruption service routine in the CCU must issue a GET L ID instruction to the processors. An automatic selection hardware for adapters, which is described in the European patent application published under No. 0011701 on Jan. 11, 1980, allows the adapter having presented the previous interrupt request to sent the identification relative to this interrupt. This identification allows LNVT table to be addressed to find the address of the parm/status area assigned to the interface and to analyze the status corresponding to the end of the operation.

For the IOH and IOH I input/output instructions, the information placed in the R1 and R2-defined registers or in the immediate value field has the following format:

| Contents Register R1 | Data Source/Receiver |
|---|---|

| Contents Register R2 of Field I | SELECT. LAD | CODE. OP | 0 x x | I/O |
|---|---|---|---|---|

The SELECT and LAD (LAB address) fields are used as address fields of the adapters.

CODE.OP is the operation code designating one of the input/output operations previously defined:

I/O=0 is an output operation (CCU T adapter),
I/O=1 is an input operation (adapter T CCU).

Two xx bits have no meaning and may be reserved for use in a different environment.

The field formats in the registers defined by R1 and R2 for the different input/output instructions will be defined in the following.

Instructions:
SET LNVT TABLE HIGH (SET LNVT H)
SET LNVT TABLE LOW (SET LNVT L)

SET LNVT H

| R1 | 0 0 0 0 0 0 0 0 | Byte X |
|---|---|---|

| R2 | SELECT LAD | 0 0 1 0 x x x 0 |
|---|---|---|

SET LNVT B

| R1 | Byte 0 | Byte 1 |
|---|---|---|

| R2 | SELECT LAD | 0 0 1 0 x x x 0 | 0 |
|---|---|---|---|

These instructions are used to modify byte X and bytes 0 and 1 which are the address indicators or pointers of table LNVT.

Instructions:
START LINE INITIAL (SLI)

| R1 | COMMAND | 0 0 0 SPIA |
|---|---|---|

| R2 | SELECT LAD | 0 0 0 1 0 x x x | 0 |
|---|---|---|---|

SPIA is the address of the line interface.

This instruction is executed according to the procedure previously defined for an IOH output operation (CCU to adapter).

The content of register R2 is sent on the IO bus at time TA via register D and stored in register 37 of the adapters. The SP processors compare the address bits SELECT and LAD with their proper addresses and the adapter concerned issues the acknowledgement signal VH.

The R1 content is then transferred at time TD to the selected adapter so that the SP processor can determine the location of the parm/status area.

A series of 32 entries (one entry per interface) in the LNVT table corresponds to each SP processor that may be addressed by the SELECT and LAD bits of byte 0 of register R2. When the SP processor has calculated the address of its input series, it adds byte 1 of R1 multiplied by 4 (since four bytes are reserved for each interface) to find the location related to the SPIA of byte 1 of register R1.

The SP processor initiates a cycle steal operation according to the process previously described for transferring two full words of table 42 in the location previously calculated to blocks ICB 45-T and 45-R assigned to the line. These two words make up the pointers of the parm/status area associated with the line, one zone being associated with transmit interface T and the other with receive interface R.

If the line is half duplex, only the first zone is used for the transmit and receive operations.

The addresses of zones 40-T and 40-R for the considered interface are thus saved in these ICB 45-T and 45-R blocks and used for transfer of the parameter zone in cycle steal mode to the processor storage at location 43 assigned to the interface; then the command defined by byte 0 of R1 is executed.

```
              Instruction:
              START LINE (SL)

R1    | COMMAND  | 0 0 0 SPIA |

R2    | SELECT LAD | 0 0 0 0 | 0 x x | 0 |
```

This instruction is used to initiate an operation on a line, the location of the parm/status area having already been determined by a previous set line initial instruction (SLI).

Byte 1 "000 SPIA" of R1 is used by the addressed SP processor to localize the ICB control block containing the pointer of the parm/status area.

By using this pointer, the addressed processor transfers in cycle steal mode the parameter zone of storage 3 to its storage 35 and executes the command.

```
              Instruction:
              GET LINE IDENTIFICATION (GET L ID)
              This instruction is of the IOHI type.

R1    | INTERFACE IDENTIFICATION |

I     | 0 0 1 1 0 0 0 0 | 0 0 0 0 x x | 1 |
```

This instruction is sent to the SP processors when a level-2 interrupt is serviced.

The selection mechanism of the SP processors ensures that this instruction is accepted by the SP processor having the most urgent service request.

This processor responds by giving the information contained in the parameter zone of the set mode which identifies the interface. The level-2 interrupts can only be serviced before execution of a set mode operation.

Generation of the address bits will be described in the following with reference to FIG. 5.

An address on IO bus 5 is assigned to each SP processor. As previously mentioned, this address is used in each of the input/output operations addressed to an SP processor or a particular interface of this processor.

Each SP processor must also respond to the general address used with the GET L ID instruction.

From the program point of view, the possibility of addressing 512 interfaces is offered in a preferred embodiment of the invention. It is assumed that these interfaces are attached to 16 processors, each one managing 32 interfaces. The storage area assigned to a processor is always of the same size and cannot be used by another processor, even if some interfaces managed by this processor are not used.

The interface address is a 9-bit address of the following format:

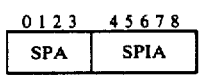

The 4-bit field SPA determines one of the 16 processors. The 5-bit field SPIA identifies a particular interface connected to the SPA-defined processor.

The SPA field contained in the interface address cannot be directly used on the IO bus; it is in effect used to generate the SELECT and LAD fields. The first three bits of field SPA represent the LAD field of the input/output instruction LAD field which represents the LAB board.

Bit 3 is used to determine bits 2 and 3 of the SELECT field. Bit 2 of the SELECT field is set to the value of bit 3 of the SPA field, and bit 3 of the SELECT field is set to a value equal to the complement of bit 3 of the SPA field. Bits 0, 1 and 4 of this field are reset in the following way:

| SP | SPA | SELECT 01234 | LAD PAC |
|---|---|---|---|
| 0 | 0000 | 00010 | 000 |
| 1 | 0001 | 00100 | 000 |
| 2 | 0010 | 00010 | 001 |
| 3 | 0011 | 00100 | 001 |
| 4 | 0100 | 00010 | 010 |
| 5 | 0101 | 00100 | 010 |
| 6 | 0110 | 00010 | 011 |
| 7 | 0111 | 00100 | 011 |
| 8 | 1000 | 00010 | 100 |
| 9 | 1001 | 00100 | 100 |
| 10 | 1010 | 00010 | 101 |
| 11 | 1011 | 00100 | 101 |
| 12 | 1100 | 00010 | 110 |
| 12 | 1101 | 00100 | 110 |
| 14 | 1110 | 00010 | 111 |
| 15 | 1111 | 00100 | 111 |

The line interface addressing does not necessarily reflect the physical line attachment, because each processor can be connected to 64 interfaces and a LAB board can have one or two processors but can only be connected to 64 interfaces.

The line interface addressing scheme is independent of the board configuration; for the network control program in the CCU storage, it will always be assumed that each LAB board contains two processors with a maximum of 32 interfaces.

The microcode controlling the SP processors and their circuits take this addressing scheme into account to establish the relationship between the interface address such as previously defined and the actual network configuration.

Figure 5:
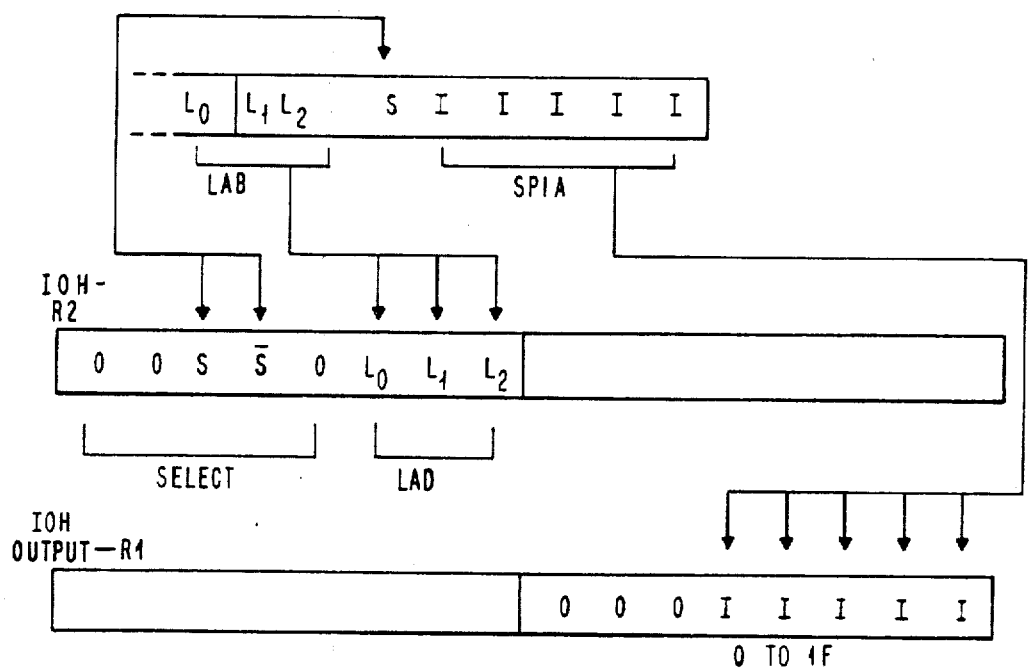
FIG. 5 illustrates the setup mechanism of the address fields.

FIG. 5 illustrates how the control program sets up the LAD, SELECT and interface address fields in the IOH instructions depending on the interface address 0 to 511.

L0L1L2 represents the bits of the LAB address which gives the LAD field, S being equal to 0 and 1 to represent the first or second processor on the LAB board.

The input/output instructions requiring an action by all SP processors set bits 2 and 3 to one and the LAD field to zero, bits 0, 1 and 4 being reset to prevent selection of other adapters on the IO bus.

```
    SELECT
    0 1 2 3 4   LAD
    [ 0 0 1 1 0   0 0 0 ]
```

Different specific commands are provides depending on the network control programs which might for example be of the NCP or EP type.

NCP is a native program such as used in the IBM 3705 Controller and EP is an emulator for the control program of the IBM 270X Controller which allows control of an IBM 3705 Controller.

The main common commands are SET MODE, ENABLE, DESABLE. The special commands depending on the different NCP or EP programs allow execution of the data and control transmit and receive operations in the different transmission protocols.

The layout of the parm/status area is specific for each control. However, the fields that are common to several commands will be placed into the same bytes.

The SET MODE command is used to personalize the line interfaces. This command must be the first one to be issued. If another command is received by an SP processor and no SET MODE command has been executed, it is rejected, that is, a level-1 interrupt request is issued.

By way of example, the contents of the parameter and status zones used with the SET MODE command is described in the following.

PARAMETER

| | |
|---|---|
| | |
| | |
| COUNT | |
| SET MODE DATA ADDRESS | |
| LINE IDENTIFICATION - LINE FDX INTERFACE T LINE HDX INTERFACES T AND R | |
| INTERFACE IDENTIFICATION R LINE FDX | |
| | |
| | |

STATUS - NORMAL MODE NCP AND EP

-continued

| SCF | CMD: X"01" |
|---|---|
| X"00" | LCS |
| 00 | 00 |
| INPUT MODEM | OUTPUT MODEM |
| | |
| | |

FDX = Full duplex
HDX = Half duplex
COUNT: This byte determines the number of data characters to be transmitted to the data zone associated with the parameter zone.

The status zone starts with an SCF byte that contains the information describing the execution of the operation.

CMD "01" indicates a SET MODE command.

LCS contains the status of the communication on the serviced line. It contains two types of information: initial status and final status.

The initial status and final status contain three types of information: initial status line BSC NCP (reception only), special status (any line protocol), error due to circuits (any line protocol).

| Initial Status | |
|---|---|
| Bits | |
| 0 1 2 | |
| 0 0 0 | Control Mode: No Received |
| Text | |
| 0 0 1 | Test Mode |
| 0 1 0 | Transparent Text Mode |
| 1 0 0 | Special Status |
| 1 1 0 | Internal Error |
| 1 1 1 | Error due to Circuits |

The configurations of the SCF and ICS fields in set mode have the following meaning:

| SCF | LCS | |
|---|---|---|
| 01000100 | 000 0 0 0 0 | Set Mode Completed NCP and EP |
| 00000000 | 110 1 0 0 1 0 | Command Rejected |
| 00000000 | 110XXXX0 | Internal Error | final status

In case of an internal error, bits 3, 4, 5 and 6 of the final LCS status have the following meaning:

| Bits 3456 | |
|---|---|
| 0000 | Error in Cycle Steal Operation |
| 0001 | Scanner Interface Error |
| 0010 | SP Interface Error |
| 0100 | Scanner Internal Error |

-continued

| Bits 3456 |
|---|
| 0101 Command Rejected |

MODEM-IN and MODEM-OUT represent the signal configurations on the control wires associated with the receive and transmit interfaces that together make up the input/output interfaces with the modem connecting the terminal to a communication line.

The set mode data comprises:
1. Information on the transmission protocol and the link control procedure,
2. Information on storage areas containing the data in the CCU,
3. Address check information,
4. Timing information.

The SET MODE command is addressed to only one of the interfaces since the two interfaces of the same line correspond to the same transmission mode. In a preferred embodiment, it is sent to the transmit interface and it will be rejected if it is sent by error to the other interface.

Thus the SET MODE commands are successively sent by the SLI or SL output operation to characterize all lines regardless of the protocol and transmission mode on these lines.

This operation is performed when implementing the network of lines attached to the controller, and a SET MODE command must be performed each time a line in an already installed network is replaced by another line operating in a different mode.

The following is a list of data transmitted in set mode:

| | | | SDLC | NCP BSC | EP BSC | S/S |
|---|---|---|---|---|---|---|
| Bytes 0–1 - Reserved | | | x | x | x | x |
| Byte 2 | Line Characteristics | | | | | |
| NCP | | | | | | |
| | Bit 0 | Line FDX | x | | | |
| | 1 | 230 Kbps | x | | | |
| | 2 | 0 (NCP) | | | | |
| | 3 | transmit two flags | x | | | |
| | 4 | (not used) | | | | |
| | 5 | (not used) | | | | |
| | 6 | transmit flags between frames | x | | | |
| | 7 | Primary = 1 Secondary = 0 | x | | | |
| EP | | | | | | |
| | Bit 0 | | | | | |
| | 1 | | | | | |
| | 2 | 1 (EP Mode) | | x | x | |
| | 3 | Interrupt Mode | | x | x | |
| | 4 | ITB = data | | | x | |
| | 5 | EIB Mode | | | x | |
| | 6 | Option 1 Modem | | x | x | |
| | 7 | 2703 Mode | | x | x | |
| Byte 3 | | | | | | |
| NCP | | | | | | |
| | Bit 0 | Generates Response Tone | x | x | | x |
| | 1 | Switched line | x | x | | x |
| | 2 | Ring Indicator Mode | x | x | | x |
| | 3 | NRZI (SDLC) or Secure | x | | x | |

| | | | SDLC | NCP BSC | EP BSC | S/S |
|---|---|---|---|---|---|---|
| | | line (S/S) | | | | |
| | 4 | Return with active RTS (FDX Facility) | x | x | | x |
| | 5 | Transmission with new synchronization | x | x | | |
| EP | | | | | | |
| | Bit 0 | TWX (connection to leased teletype terminal) | | | | |
| | 1 | Switched line | | | x | x |
| | 2 | Ring Indicator Mode | | | x | x |
| | 3 | Secure Line | | | | x |
| | 4 | Return with Active RTS | | | x | x |
| | 5 | Transmission with new synchronization | | | x | |
| | 6 | Faulty PAD (padding character ignored) | | | x | |
| | 7 | STX character included in BCC | | | x | |
| Byte 4 | | | | | | |
| Bits 0–3 (Field LCD) | | | | | | |
| | Hexadecimal 0 | SS 9/6 | | | | x |
| | 1 | Reserved | | | | |
| | 2 | SS 8/5 | | | | x |
| | 3 | Automatic call | x | x | x | |
| | 4 | SS 9/7 | | | | x |
| | 5 | SS 10/7 | | | | x |
| | 6 | SS 10/8 | | | | x |
| | 7 | SS 11/8 | | | | x |
| | 8 | Reserved | | | | |
| | 9 | SDLC | x | | | x |
| | A | Reserved | | | | |
| | B | Reserved | | | | |
| | C | BSC EBCDIC | | x | x | |
| | D | BSC ASCII | | x | x | |
| | E | BCS ASCII transparent (EP) | | | x | |
| | F | Reserved | | | | |
| 4–7 NCP/EP Buffer prefix size in CCU data storage | | | x | x | x | x |
| Byte 5 Line Speed and clocking | | | | | | |
| If synchronous line | | | | | | |
| Bit 0 = 1 | | | x | x | x | x |
| 1–4 line speed if internal clock | | | x | x | x | x |
| | 0001 | 50 Bps | | | | |
| | 0010 | 110 Bps | | | | |
| | 0100 | 134.5 Bps | | | | |
| | 0111 | 200 Bps | | | | |
| | 1000 | 300 Bps | | | | |
| | 1011 | 600 Bps | | | | |
| | 1101 | 1200 Bps | | | | |
| | 1110 | Special | | | | |
| 5 External Clock | | | x | x | x | x |
| 6 Data Rate Selection | | | x | x | x | x |
| 7 Medium Speed Local Attachment | | | x | x | x | x |
| If asynchronous line S/S | | | | | | |
| Bit 0 = 0 | | | | | | x |
| 1–4 Line speed if internal clock | | | | | | x |
| | 0000 | 50 Bps | | | | |
| | 0011 | 110 Bps | | | | |
| | 0101 | 134.5 Bps | | | | |
| | 0110 | 200 Bps | | | | |
| | 1001 | 300 Bps | | | | |
| | 1010 | 600 Bps | | | | |
| | 1100 | 1200 Bps | | | | |
| | 1111 | Special | | | | |
| 5 External Clock | | | | | | x |
| 6 Data rate selection | | | | | | x |
| 7 Medium Speed | | | | | | x |

-continued

|  | SDLC | NCP BSC | EP BSC | S/S |
|---|---|---|---|---|
| Local attachment Byte 6 NCP/EP Buffer Size (size of the data in the buffer) | x | x | x | x |

The following bytes are only used by program NCP
Byte 7
    Bits 6–7    Total length of    x
                  Field A to C with
                  a secondary
                  station
    Bytes 8–9   SDLC
                  Secondary station  x
                  address The meaning of some fields is given hereafter:
NCP Byte 2—Bit 6 "Transmit Flags Between Frames"

In SDLC mode, when this bit is set and the line turn around modifier is reset (in HDX, one switches from transmission to reception), in the SDLC transmit command, flags are sent after the frame. If this bit is reset, hexadecimal FF characters are issued.
Bit 7 "Primary/Secondary"

Primary station for an SDLC line means that the SP processor is a primary station on the line. If this bit is reset, the SP processor is a secondary station.
NCP/EP Byte 4—Bits 4 to 7

They define the size of the prefix field of a buffer area reserved for storing data in the CCU. This prefix contains information on: the indicator of the following buffer area in the chain, the relative displacement at data start, and the data count.

The BSC, SDLC, S/S, RTS, NRZI, ITB, EIB abbreviations are the standard abbreviations used in the different transmission protocols.

Processing of a SET MODE command by the processor includes the steps of:
1. Transferring the interface-related parameters from zone 40 of the CCU storage to zone 43 of the SP processor storage,
2. Saving the identification of the interface (HDX) or the interfaces (FDX) in the corresponding ICB block,
3. Obtaining the set mode data from the CCU,
4. Saving the data in the area of SP processor storage 46 assigned to the interface,
5. Transferring the parameters from area 46 to scanner S.
6. Setting up the status information and transferring it to the status zone of field 46.
7. Issuing a level-2 interrupt request.

Once the network is personalized, the message transfer operations between the terminals and the central processing unit are performed using the commands ENABLE, TRANSMIT or RECEIVE, and DESABLE, which are the conventional commands in the networks.

Figure 6:
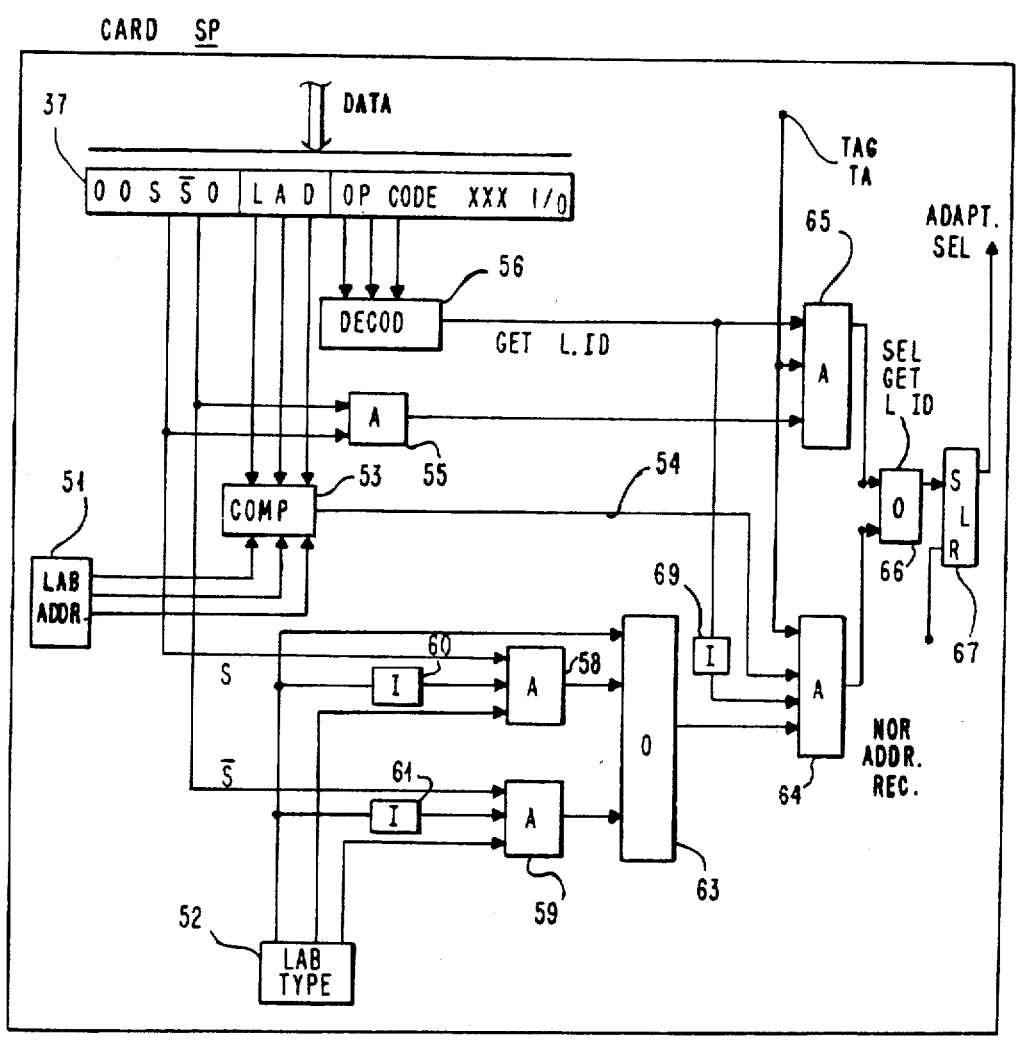
FIG. 6 illustrates the address recognition circuit design.

FIG. 6 represents the address decoding circuit.

To execute a IOH operation according to the previously described procedure at time TA, the contents of the register defined by R2 is transferred by the IOC interface on IO bus 5 and is received in register 37 of all SP processors.

The address information is wired on each LAB board card including an SP processor. Circuit 51 comprising switches supplies to its three outputs the wired address of the LAB board. Circuit 52 supplies the indication of the LAB type, for example:

| one processor/LAB | 100 | |
| two processors/LAB | 001 | interface 0 to 31, 16 lines |
| | 010 | interface 32 to 63, 16 lines |

For example for board LAB-3, the first card with processor SP1 and the second card with processor SP2 have the addresses wired 001 and 010 respectively, these addresses being supplied by circuits 52 of these cards.

A comparator 53 compares the wired LAB address supplied by circuit 51 with the LAD field in register 37 and applies to its output 54 a level-high signal when these two bit patterns are equal.

An AND circuit 55 receives on its input bits S and $\bar{S}$ of the SELECT field and supplies a level high output signal only when a get line identification operation is to be executed, because then the two bits S and $\bar{S}$ are set.

Decoding circuit 56 receives the operation code and recognizes the pattern of the get line identification operation to supply a level-high output signal when the operation code is decoded, that is, when all adapters are selected. The logical circuit, comprising the AND gates 58 and 59 and the OR circuit 63, produces at the output of circuit 63 a level-high signal when the S and $\bar{S}$ bit pattern corresponds to the wired address provided by circuit 52.

For example, in case the wired address at the output of circuit 52 is 001, which means that it is a LAB with two processors, AND gate 59 receives a bit 1 from inverter 61 and supplies a level-1 signal to OR circuit 63, if S and $\bar{S}$ are respectively 01.

In case the wired address supplied by circuit 52 is 010, AND circuit 58 supplies a level-1 signal if S and $\bar{S}$ are respectively 10.

In case the wired address is 100, which means that it is a LAB with one processor, OR circuit 63 is directly gated.

The output of OR circuit 63 is applied to AND circuit 64 with the output 54 of the comparator and the output of decoder 56 inverted by circuit 69 and tag TA. Therefore, AND circuit 64 supplies a level-1 signal if the LAB address has been recognized at time of tag TA and, the operation is not a get line identification operation. It supplies the normal address recognition signal NOR. ADDR. REC.

AND gate 65 receives the output of AND circuit 55, the output of decoder 56, and tag TA to deliver a selection signal (SEL GET L ID), so that the adapter can respond and possibly send the identification of the interface identification according to the previously described procedure. The outputs of AND circuits 64 and 65 are applied to OR circuit 66 connected to a latch 67 supplying the ADAPT. SEL. selection signal.

While the invention has been particularly shown and described with reference to a preferred ambodiment thereof, it will be understood by those skilled in the art that numerous changes in form and detail may be made therein without departing from the spirit and scope of the invention.

We claim:
1. In a communication controller of the type comprising a central control unit (CCU) connected to a control unit storage (3), part of which is used for storing a network control program, said central control unit being connected through an input/output interface (IOC) to an input/output bus (IO-5) to which are attached, on the one hand, communication line adapters (SP,S) including a microprocessor (SP) and a storage (35), and, on the other hand, at least one central processing unit (CPU), with the central control unit communicating with the adapters by means of cycle steal transfer operations (AIO) and input/output program initiated operations (PIO) a method of exchanging information, characterized in that it includes the steps of:

during initialization:
causing the network control program to set up in the storage of the control unit a correspondence table (42) from a predetermined starting address, said table including first and second address positions for each communication line, with each position storing the address of an area (40) of the central control unit storage reserved for storing parameter, status and data information corresponding to the transmit interface and to the receive interface of each communication line,
transferring the starting address to each adapter by means of a first set of output program initiated operations, for a first communication:
causing the central control unit to send for each line interface, by means of an output program initiated operation termed start line initial, a first code (SELECT LAD) specifying the address of an adapter to be selected,
causing the adapter that recognized its address to send an acknowledgement signal and to become selected, and storing the first code in the adapter,
causing the central control unit to send a second code specifying the address of a selected interface of a selected line (SPIA) and an initialization command to the selected interface,
causing the microprocessor of the adapter to calculate the correspondence table address corresponding to the selected interface of the selected line as a function of the first and second codes and the starting address of the correspondence table, so as to cause the transfer in cycle steal mode of the information contained at this address in a control block associated with a microprocessor storage location area assigned to the interface of said line for storing parameter, status and data information relative to the said interface,
causing the information to be exchanged in cycle steal mode between the area assigned to the selected interface in the central control unit storage and the microprocessor storage location area assigned to the interface, for operations in the normal exchange mode on a selected interface;
causing the central control unit to send, by means of an output program initiated operation termed start line, the first code specifying the address of the adapter to be selected,
causing the adapter that recognized its address to send an acknowledgement signal and to become selected,
sending the code specifying the address of the selected interface used by the selected adapter to locate the control block in the microprocessor storage containing the address of the area in the central control unit storage assigned to the interface and a message transfer command to this interface,
exchanging information to be exchanged in cycle steal mode between the area located at the address contained in said located control block and the area assigned to the selected interface in the microprocessor storage.

2. A method according to claim 1, characterized in that one of the parameters in the area assigned to each interface in the microprocessor storage includes the address identification and the interface type.

3. A method according to claim 2, characterized in that it includes the steps of:
sending to all adapters, by means of an output program initiated operation termed get line identification, upon completion of an operation involving an interface, a third code recognized by them,
causing the adapter having a request for service with the highest priority level to send the interface address contained in the parameter area, and
transferring in cycle steal mode, the status information from the area assigned to the interface in the microprocessor storage to the area assigned to the interface in the central control unit storage.

4. A method according to claim 3 characterized in that the correspondence table includes a number of positions equal to the maximum number 2n of interfaces that can be managed by the controller and in that the number of reserved areas in the central control unit storage is equal to the maximum number 2n of interfaces, each area being dedicated to the storing of parameter and status information and being associated with a chain of storage locations used for storing the data to be exchanged by the corresponding interface.

5. A method according to claim 4, characterized in that the initialization command causes initialization parameters and associated initialization data characterizing the type of interface to be transferred to the parameter area of the microprocessor storage.

6. A method according to any one of claims 1-5, in which the adapters are arranged on boards, with each board comprising one of a plurality of adapters depending upon their types, characterized in that the first code specifying the adapter address includes:
a first field (LAD) containing a sufficient number of bits to count up to n/k in binary notation, with 2k being the maximum number of interfaces that can be connected to a board comprising one or two adapters, the first field identifying the first board connected to the input/output bus being an all-zeroes field and the first field identifying the last board connected to the input/output bus being an all-ones field,
a second field (SELECT) in which a first bit is set to a first binary value and a second field is set to a second binary value for addressing the k/2 interfaces and the first bit is set to the second binary value for addressing the next k/2 interfaces.

7. A method according to claim 6 characterized in that the third code in order that it may be recognized by all adapters, includes the first field which is set at all zeroes and the second field in which the first and the second bits are both set to the same binary value.

8. In a communication controller of the type comprising a central control unit (CCU) connected to a control unit storage (3), part of which is used for storing a network control program, said central control unit being connected through an input/output interface (IOC) to an input/output bus (IO-5) to which are attached, on the one hand, communication line adapters (SP,S) including a microprocessor (SP) and a storage (35), and, on the other hand, at least one central processing unit (CPU), with the central control unit communicating with the adapters by means of cycle steal transfer operations (AIO) and input/output program initiated operations (PIO) a system for exchanging information, characterized in that it comprises:

means which are active during initialization and which comprises:

means for causing the network control program to set up in the storage of the control unit a correspondence table (42) from a predetermined starting address, said table including first and second address positions for each communication line, with each position storing the address of an area (40) of the central control unit storage reserved for storing parameter, status and data information, corresponding to the transmit interface and to the receive interface of each communication line, means for transferring the starting address to each adapter by means of a first set of output program initiated operations, means which are active during a first communication and which comprises:

means in the central control unit for sending for each line interface, by means of an output program initiated operation termed start line initial, a first code (SELECT LAD) specifying the address of an adapter to be selected, means in the adapter responsive to the first code for causing the adapter which recognized its address to send an acknowledgement signal and to become selected, and to store the first code in the adapter, means in the central control unit for sending a second code specifying the address of a selected interface of a selected line (SPIA) and an initialization command to the selected interface, means in the microprocessor of the adapter responsive to the starting address, the first and second codes for calculating the correspondence table address corresponding to the selected interface of the selected line as a function of the first and second codes and the starting address of the correspondence table, so as to cause the transfer in cycle steal mode of the information contained at this address in a control block associated with a microprocessor storage location area assigned to the interface of said line and comprising status, parameter and data areas, means for causing the information to be exchanged in cycle steal mode between the area assigned to the selected interface in the central control unit storage and the microprocessor storage location area assigned to the interface, means which are active during a normal exchange on a selected interface and comprising:

means in central control unit for sending, by means of an output program initiated operation termed start line, the first code specifying the address of the adapter to be selected, means responsive to the first code for causing the adapter that recognized its address to send an acknowledgement signal and to become selected, means for sending the code specifying the address of the selected interface to the selected adapter which uses this address to locate the control block in the microprocessor storage containing the address of the area in the central control unit storage assigned to the interface, and a message transfer command to this interface, means for causing information to be exchanged in cycle steal mode between the area of the central control unit storage located at the address contained in said located control block and the area assigned to the selected interface in the microprocessor storage.

9. A system according to claim 8, characterized in that the area assigned to each interface in the microprocessor storage includes a parameter comprising the address identification and the interface type.

10. A system according to claim 9, characterized in that it comprises:

means for sending to all adapters, by means of an output program initiated operation termed get line identification, upon completion of an operation involving an interface, a third code which is recognized by all the adapters, means for causing the adapter having a request for service with the highest priority level to send the interface address contained in the parameter area, and means for transferring in cycle steal mode, the status information from the area assigned to the interface in the microprocessor storage to the area assigned to the interface in the central control unit storage.

11. A system according to claim 10 characterized in that the corresponding table includes a number of positions equal to the maximum number 2n of interfaces that can be managed by the controller and in that the number of reserved parameter/status areas in the central control unit storage is equal to the maximum number 2n of interfaces, each area being associated with a chain of storage locations used for storing the data to be exchanged by the corresponding interface.

12. A system according to any one of claims 8 to 11 characterized in that the initialization command causes initialization parameters and associated initialization data characterizing the type of interface to be transferred to the parameter area of the microprocessor storage.

13. A system according to any one of claims 8 to 11 in which the adapters are arranged on boards comprising one or a plurality of adapters depending upon their types, characterized in that the first code specifying the adapter address includes:

a first field (LAD) containing a sufficient number of bits to count up to n/k in binary notation, with 2k being the maximum number of interfaces that can be connected to a board comprising one or two adapters, the first field identifying the first board connected to the input/output bus being an all-zeroes field and the first field identifying the last board connected to the input/output bus being an all-ones field, a second field (SELECT) in which a first bit is set to a first binary value and a second field is set to a second binary value for addressing the k/2 interfaces and the first bit is set to the second binary value for addressing the next k/2 interfaces.

14. A system according to claim 13 characterized in that the third code in order that it may be recognized by all adapters, includes the first field that is set at all-zeroes and a second field in which the first and the second bits are both set to the same binary value.

15. A system according to claim 12 characterized in that each adapter comprises means for generating an address recognition signal including:
- a first circuit (51) whose output supplies a first bit pattern representative of the number of the board on which the adapter is located,
- a second circuit (52) whose output supplies a second bit pattern representative of the type of board,
- comparing means (53) for comparing the first field (LAD) which is received from the input/output bus with the first bit pattern to supply an output signal indicating that said first field is coincident with the first pattern,
- a third circuit (58,59,63,64) responsive to the first and second bits of the second field, to the second bit pattern representative to the type of board and to the output signal of the comparing means for generating the address recognition signal when the first field is coincident with the first pattern and when the first and second bits of the second field match the type of board.

16. A system according to claim 14 characterized in that each adapter includes means for generating an adapter selection signal comprising:
- a first circuit (51) whose output supplies a first bit pattern representative of the number of boards on which the adapter is located,
- a second circuit (52) whose output supplies a second bit pattern representative of the type of board,
- comparing means (53) for comparing the first field (LAD) which is received from the input/output bus with the first bit pattern to supply an output signal indicating that said first field is coincident with the first pattern,
- a third circuit (58,59,63,64) responsive to the first and second bits of the second field, to the second bit pattern representative to the type of board and to the output signal of the comparing means for generating the address recognition signal when the first field is coincident with the first pattern and when the first and second bits of the second field match the type of board,
- a fourth circuit (56,65) responsive to the reception of the third code and to the first and second bits of the second field for generating a selection signal when the third code is recognized and when the first and second bits have the same value,
- a fifth circuit (66,67) that receives the recognition signal and the selection signal and generates therefrom the adapter selection signal when either of said signals is present.

* * * * *